United States Patent [19]

Hsieh

[11] Patent Number: 4,768,226
[45] Date of Patent: Aug. 30, 1988

[54] LOCK FOR PUSHBUTTON PHONE
[76] Inventor: Tung-Chiang Hsieh, No. 6, Lane 210, Chung Cheng South Road, yung Kang Hsiang, Tainan Hsieh, Taiwan
[21] Appl. No.: 32,466
[22] Filed: Mar. 31, 1987
[51] Int. Cl.$^4$ .............................................. H04M 1/66
[52] U.S. Cl. ............................... 379/445; 70/DIG. 72
[58] Field of Search ............................... 379/445, 451; 70/DIG. 72

[56] References Cited

U.S. PATENT DOCUMENTS 4,304,971  12/1981  Flax ........................................ 379/445
4,323,739   4/1982  Flax et al. ............................. 379/445

FOREIGN PATENT DOCUMENTS 2812540   9/1979  Fed. Rep. of Germany ...... 379/445
2916630  11/1980  Fed. Rep. of Germany ...... 379/445
2919599  11/1980  Fed. Rep. of Germany ...... 379/445
2922662   1/1981  Fed. Rep. of Germany ...... 379/445
3013944  10/1981  Fed. Rep. of Germany ...... 379/445
3205626   8/1983  Fed. Rep. of Germany ...... 379/445

OTHER PUBLICATIONS

Telephony, "Phone Lock Product", Jun. 1, 1981, p. 118.

Primary Examiner—Jin F. Ng
Assistant Examiner—Danita R. Byrd
Attorney, Agent, or Firm—Lowe, Price, Leblanc, Becker & Shur

[57] ABSTRACT

A lock is provided for a pushbutton phone, whereby when a correct key is inserted to rotate a cylinder an actuating member is forced to rotate therewith so that two arms of the actuating member urge two sliding plates to slide, causing the projections of the sliding plates to bear against the arms of a confining member and enabling teeth on the arms of the confining member to lock up the pushbuttons. When the correct key is inserted to rotate the cylinder back to its original position, the projections of the sliding plates separate from the arms of the confining member and the arms then go back to their original states to release the pushbuttons.

2 Claims, 4 Drawing Sheets

LOCK FOR PUSHBUTTON PHONE

BACKGROUND OF THE INVENTION

It is an object of the present invention to provide a lock which may be adapted for use with a pushbutton phone.

SUMMARY OF THE INVENTION

It is the primary object of the present invention to provide a lock for a pushbutton phone which can lock up four pushbuttons of the phone.

It is another object of the present invention to provide a lock for a pushbutton phone which has an appearance of a truncated pyramid.

It is still another object of the present invention to provide a sturdy lock for a pushbutton phone.

It is still another object of the present invention to provide a lock for a pushbutton phone which can adapt to the pushbuttons of the phone in both directions.

It is a further object of the present invention to provide a lock for a pushbutton phone which is difficult to open without using the correct key.

It is also a further object of the present invention to provide a lock for a pushbutton phone which is inexpensive to manufacture.

The above and other objects and advantages of the present invention will appear more fully hereinafter from a consideration of the detailed description which follows taken together with the accompanying drawings wherein like numerals refer to like or similar parts.

DETAILED DESECRIPTION OF THE PREFERRED EMBODIMENT

Figure 1:
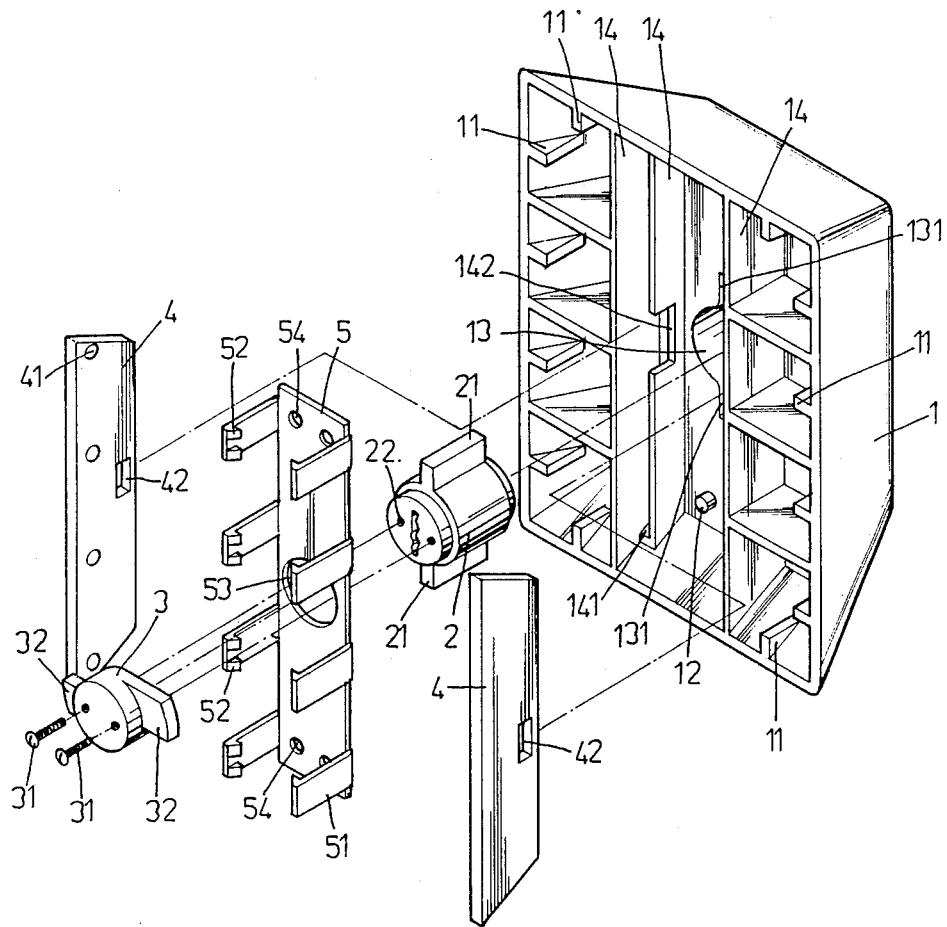
FIG. 1 is an exploded view of the present invention.

With reference to the drawings, and in particular to FIG. 1 thereof, a lock for a pushbutton phone according to the present invention comprises a case 1, a cylinder 2, an actuating member 3, a sliding plate 4 and a confining member 5.

Figure 5:
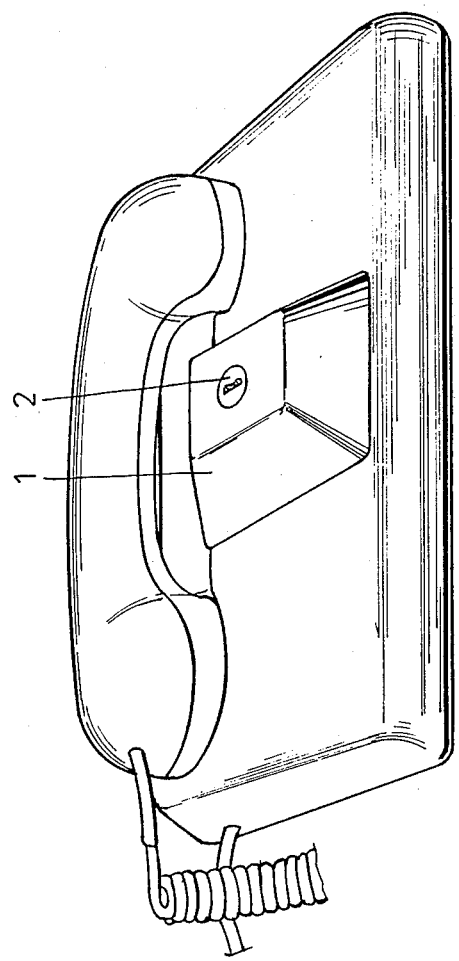
FIG. 5 is a perspective view of the present invention.

The interior of the case 1 is provided with a plurality of lattices adapted to the pushbuttons of the phone. The lattices of both sides of the case 1 can just accomodate corresponding pushbuttons of the phone. In each lattice of both sides of the case there is a protuberance 11 which is designed to set the case 5 in a position when engaged with the pushbuttons. The middle portion of the case 1 is formed with four projections 12 on the bottom thereof. Formed at the center of the middle portion is an opening 13 having two slots 131 respectively extending from the upper part and lower part. The middle portion of the case 1 is separated from both side portions by two partitions 14 each having a guide way 141 in which the sliding plate 4 may move along. The inner wall of the partition 14 is provided with a rectangular notch 142. The outer appearance of the case 1 looks like a truncated pyramid as shown in FIG. 5, so that once the pushbuttons are covered by the case 1, it is impossible to pull it up by manual force.

The cylinder 2 has two protuberances 21 extending respectively from the upper part and lower part thereof and hence the whole cylinder 2 can be closely fitted into the opening 13 of the case 1. The inner end of the cylinder 1 is provided with two threaded holes 22.

The actuating member 3 is fixedly attached to the inner end of the cylinder 2 by two screws 31. The actuating member 3 is formed with two arms 32 respectively extending from two sides thereof. Each of the arms 32 is received in a rectangular notch 142 of the partition 14 of the case 1.

Two sliding plates 4 are provided, each being disposed into one of the guide ways 141 of the partition 14 of the case 1. The inner side of the sliding plate 4 has four projections 41 spaced apart by a equal distance. A rectangular slot 42 is formed at the middle portion of each sliding plate 4 for receiving the corresponding arm 32 of the actuating member 3. The actuating member 3 is formed with two slanting ends so that it can move without difficulty.

Each vertical side of the confining member 5 has four arms 51 provided with suitable resilience. Each arm 51 is formed with two teeth 52 at the free end thereof. The confining member 5 has a center hole 53 from which the cylinder 2 may extend through. At each corner of the confining member 5 there is a hole 54 adapted to receive a corresponding projection 12 of the case 1. The projection 12, which is made of plastics, is fused by heating so that the confining member 5 is fixedly mounted into the case 1.

Figure 2:
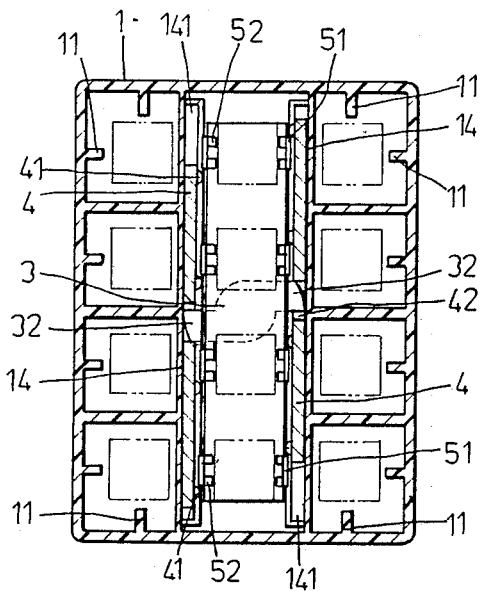
FIG. 2 is a first working view of the present invention.
Figure 3:
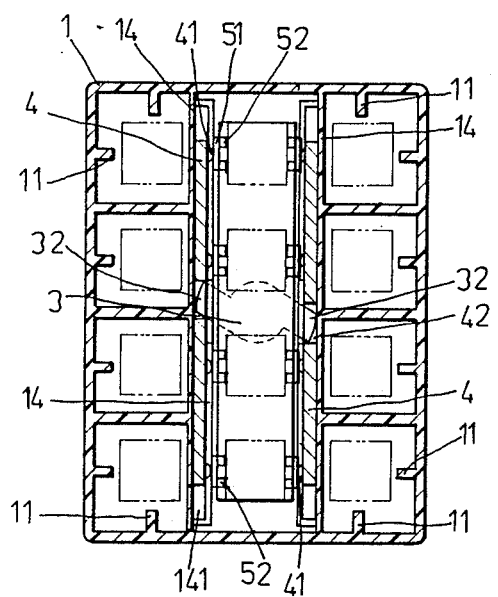
FIG. 3 is a second working view of the present invention.
Figure 4:
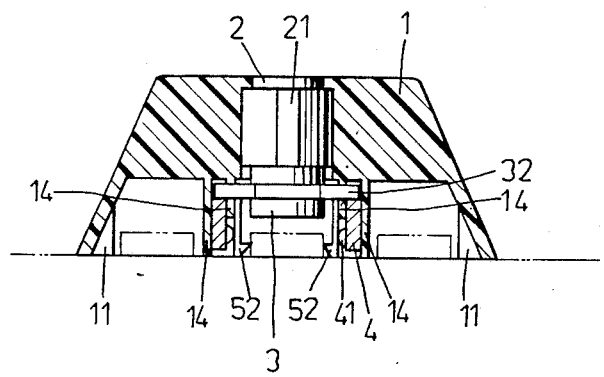
FIG. 4 is a cross-sectional view of the present invention.

Referring to FIG. 2, when the pushbuttons are enclosed by the case 1, the teeth 52 of the confining member 5 are kept at an appropriate distance from the four pushbuttons in the middle row and the projections 41 of the two sliding plates 4 are not in contact with the arms 51 of the confining member 5. Looking now at FIGS. 3 and 4, when a correct key is inserted to rotate the cylinder 2, the actuating member 3 will be forced to rotate therewith. Hence, the two arms 32 of the actuating member 3 will urge the two sliding plates 4 to slide, causing the projections 41 of the two sliding plates 4 to move to the arms 51 of the confining member 5. As the projections 41 of the two sliding plates 4 bear against the arms 51 of the confining member 5, the teeth 52 of the arms 51 of the confining member will clamp the four pushbuttons tightly thereby forming a locking condition. In addition to the truncated pyramidal shape of the case 1, the lock according to the present invention is almost impossible to open without using the correct key. When desired to open the lock, a user simply inserts the correct key and rotates the cylinder 2 back to its original position so as to separate the projections 41 of the sliding plates from the arms 51 of the confining member 5. Then, the arms 51 of the confining member 5 will go back to their original dispositions shown in FIG. 2 and the pushbuttons will be released.

From the foregoing, it will be observed that numerous variations and modifications may be effected without departing from the true spirit and scope of the novel concept of the present invention. It will be understood that no limitations with respect to the specified article illustrated herein is intended to cover by the appended claims all such modifications as fall within the scope of the claims.

I claim:

1. A lock for a pushbutton phone comprising:

a case partitioned into a plurality of lattices adapted for receiving pushbuttons of the phone, a lattice being provided on each of two sides of the case, having a protuberance designed to set the case in a selected position when engaged with the pushbuttons, said case being provided at its center with an opening having two slots extending from upper and lower parts thereof, a middle portion of the case being separated from both side portions of the case by two partitions each having a guideway;

a cylinder disposed at the center of the case;

an actuating member, formed with two extended arms, rigidly mounted at the innermost end of the cylinder and rotatable with the cylinder;

two sliding plates, each having at an inner side four projections spaced apart by an equal distance, each of said sliding plates being separately mounted slidably in one of the corresponding guideways of the case and controlled by said actuating member; and a confining member having vertical sides each of which has a plurality of resilient arms, each arm being provided with two teeth at a free end thereof, whereby when a correct key is inserted to rotate the cylinder, the actuating member mounted thereto will be forced to rotate therewith and hence the two arms of the actuating member will urge the two sliding plates and the projections thereof to bear against the arms of the confining member and therefore enabling the teeth of the arms of the confining member to lock up the pushbuttons, and when the correct key is inserted to rotate the cylinder back to an original position, the projections of the sliding plates will be separated from the arms of the confining member which will then go back to their original dispositions to release the pushbuttons.

2. A lock for a pushbutton phone as claimed in claim 1, wherein said case has the general shape of a truncated pyramid.

* * * * *